United States Patent [19]
Lebeau

[11] Patent Number: 5,870,626
[45] Date of Patent: Feb. 9, 1999

[54] DEVICE FOR THE COMPUTER LINKING OF APPARATUSES WITH HETEROGENEOUS COMMUNICATION SYSTEMS, AND KEY PERTAINING TO SUCH A DEVICE

[76] Inventor: Luc Lebeau, 11, rue de la Biche, B-7000 Mons, Belgium

[21] Appl. No.: 714,094
[22] PCT Filed: Apr. 4, 1995
[86] PCT No.: PCT/FR95/00424
§ 371 Date: Sep. 17, 1996
§ 102(e) Date: Sep. 17, 1996
[87] PCT Pub. No.: WO95/27943
PCT Pub. Date: Oct. 19, 1995

[30] Foreign Application Priority Data

Apr. 8, 1994 [FR] France .................................. 94 04150

[51] Int. Cl.$^6$ ....................................................... G06F 3/00
[52] U.S. Cl. ............................................ 395/831; 395/834
[58] Field of Search ..................................... 395/651, 652, 395/653, 712, 828, 830, 831, 834

[56] References Cited

U.S. PATENT DOCUMENTS

| | | | |
|---|---|---|---|
| 5,420,412 | 5/1995 | Kowalski | 395/831 |
| 5,644,712 | 7/1997 | Coscarella et al. | 395/828 |
| 5,664,229 | 9/1997 | Bhargava et al. | 395/831 |

*Primary Examiner*—Kevin A. Kriess
*Attorney, Agent, or Firm*—Young & Thompson

[57] ABSTRACT

A device (L) for transferring data between heterogeneous apparatuses (1, 2, 3 and 4) and one or more computers (18 and 19). An interface (20) is automatically configured by loading and executing specific protocol conversion programs and adapting the physical link on the basis of recognition of the connecting cable (5, 6, 7, 8, 16 or 17) between the interface and the computer(s) and apparatus(es) to be connected. The connecting cable is recognized by entering a key (k5, k6, k7, k8, k16 or k17) in the cable in the form of one or more electrical or electronic components providing nonambiguous identification of the cable.

19 Claims, 1 Drawing Sheet

DEVICE FOR THE COMPUTER LINKING OF APPARATUSES WITH HETEROGENEOUS COMMUNICATION SYSTEMS, AND KEY PERTAINING TO SUCH A DEVICE

BACKGROUND OF THE INVENTION

The invention relates to a device allowing the transfer of computer data between on the one hand heterogeneous apparatuses and on the other hand one or more computers.

DESCRIPTION OF THE RELATED ART

There are already numerous devices, or interfaces, for the computerized linking of machines of different types. They are often specific to a given hardware. It is generally tedious if not impossible to adapt these interfaces to other hardware with varied protocols and/or different physical links. In the medical field, for example, it is virtually impossible in most cases to link a monitor of one make to a monitor of another make. If it is desired to connect a computer for data centralization, for example an alarm facility, to several apparatuses of different makes, the user is forced to develop software and specific hardware and he then finds himself confronted with the problem of linking all these specific modules to a single computer. Although this problem is still solvable with two or three apparatuses to be connected, it becomes a real headache with the rise in and diversity of the apparatuses to be connected and even if achieved leads anyway to systems which cannot be exploited in practice.

SUMMARY OF THE INVENTION

The objective of the present invention is to remedy these drawbacks by automatically configuring an interface by loading and executing specific programs for protocol conversion and by adapting the physical link, on the basis of recognizing the link cable between the interface on the one hand and the computer or computers and apparatuses to be connected on the other hand.

The device according to the invention is characterized in that a key is attached or contained in the link cable linking on the one hand an interface and on the other hand one or more apparatuses or computers; this key takes the form of a component or set of electrical or electronic components; the interface having the means of reading this key and therefore of identifying the cable which is connected thereto; the interface being fitted with plugs making it possible to connect each of these cables to a "channel" processor; these channel processors being capable of being configured at software level following the reading of these keys specific to each link cable; these channel processors being linked within the interface to a "central" processor; this central processor benefitting from a library of protocol conversion programs; all these processors being fitted with a linkage allowing on the one hand the transfer of the protocol conversion programs and information required for the proper operation of the interface and on the other hand the bidirectional transfer of the information between the machine or machines and the computer or computers linked to the interface.

The channel processors are also capable of being configured at hardware level following the reading of the keys specific to each link cable between the said interface and the apparatuses and the computers to be linked; this configuring is done by adapting the physical layer by means of electrical or electronic switching of hardware specific to the link, the central processor benefitting from an additional library for configuring the physical links.

BRIEF DESCRIPTION OF THE DRAWINGS

The invention will be better understood with the aid of the description which follows with reference to the appended drawings.

DESCRIPTION OF THE PREFERRED EMBODIMENTS

Figure 1:
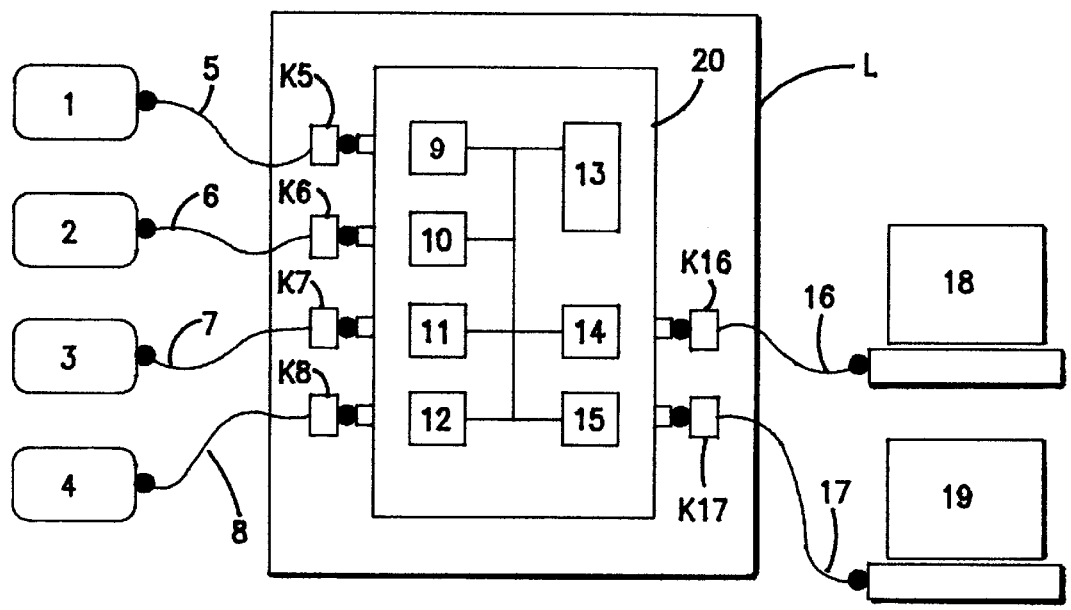
FIG. 1 is a representation of the device for the computer linking of apparatuses and computers.

In the implementation illustrated in FIG. 1, the apparatuses 1, 2, 3 and 4 are linked to the interface 20 by cables 5, 6, 7 and 8 each including an identification key k5, k6, k7 and k8. Four apparatuses have been chosen for this example but their number is not limited. The interface 20 effects the recognition of the keys k5, k6, k7 and k8 and, depending on this recognition, uses the specific communication protocols and hardware in order to make possible the transfer of information between the apparatuses 1, 2, 3 and 4 and the interface 20.

Furthermore, the interface 20 is linked to one or more computers 18 and 19 by the cables 16 and 17. Two computers have been chosen for this example but their number is not limited to two. The interface 20 effects the recognition of the keys k16 and k17 and, depending on this recognition, uses the specific communication protocols and hardware in order to make possible the transfer of information between the computers 18 and 19 and the interface 20.

It is clear that after loading a communication protocol conversion program appropriate to the protocol of the apparatus or to the protocol of the computer linked, as well as after adapting the physical layer, the interface can communicate with on the one hand the apparatus or apparatuses and on the other hand the computer or computers.

The interface 20 is made up of apparatus channel processors 9, 10, 11 and 12 (4 are represented by way of example but the number is not limited), of computer channel processors 14 and 15 (2 are represented by way of example but the number is not limited) and of a central processor 13. The auxiliary modules which are not specific to the invention but are necessary for the proper operation of the interface, such as, among others, the power supply, are not represented.

The central processor 13 includes a library of programs for converting protocols associated with the keys read on the link cables. It also possesses a library of codes allowing the selection of circuits specific to the physical layer of the link. This central processor 13, on request from the channel processors 9, 10, 11, 12, 14 and 15, has the means to send them the various protocol conversion programs and the various hardware selection codes so that these channel processors can subsequently execute these programs and adapt their hardware in order to communicate with the apparatuses or computers to which they are linked. The central processor 13 has the means to enter into communication with all the channel processors which are linked to it and it has the means to effect and orchestrate the transfers of data between these various channel processors.

By apparatus channel processor 9, 10, 11 and 12 and computer channel processor 14 and 15 it is understood that an electronic subunit capable of:

1) reading the key for recognizing the link cable when the latter is plugged into the interface,
2) making a protocol conversion program loading request to the central channel 13 on the basis of the information read from the key,
3) downloading the protocol conversion program from the central channel 13 and executing it, downloading the information deemed to be useful for its proper operation,
4) adapting the specific hardware in order to effect the link (for example, choosing the RS232 or RS422 standard which includes a number of different conductors, different voltage levels and, generally, different interface circuits) by electrical or electronic switching of specific hardware (electronic or electrical circuits specific to the communication standards) on the basis of information loaded under item 3,
5) carrying out the computer linking of data and communicating with the apparatuses or computers by executing the program loaded under item 3, and
6) communicating with the central processor 13 and with the other channel processors.

By way of example, such a channel processor may be embodied by means of a microcontroller of the 82C320 type from the company DALLAS in conjunction with a static random access memory circuit, an EPROM type read only memory circuit and peripheral circuits. Appropriate software will make it possible on the one hand to provide for all the functions described above, among others the reading of the key on one of the input/output ports of the processor, communication between channels on a serial communication port and communication with the apparatuses or computers to be linked on the second serial communication port of the said processor. The central processor 13 can, for example, be embodied on the basis of the same technology with an expanded memory for storing the libraries and battery backup of their content. This constitutes one example among others of the embodying of a channel of the interface. The possibilities for embodying such a channel are virtually unlimited by reason of the multitude of electronic components currently available on the market.

The difference between the apparatus channel processors 9, 10, 11 and 12 and the computer channel processors 14 and 15 is that only the computer channel processors 14 and 15 enable the computers 18 and 19 to change the configuration and possibly to load other programs and other data on the central channel 13 and thereby are able to load new protocol conversion programs and new keys and modify the operation of the complete system.

Figure 2:
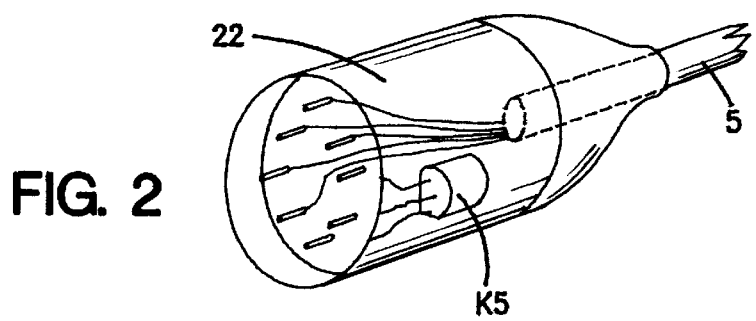
FIG. 2 represents a possible connection of a key to a cable, for example in a plug.

FIG. 2 illustrates the plugging in of an electronic component k5 (for example a DS2224 read only memory from the company DALLAS) acting as electronic key, to the pins of the socket 22, thus enabling the various channel processors to read, by means of an adapted program, the content of this read only memory. The use of the component k5 is an illustration of the process for associating a computerized key with a link cable. Other components of the EEPROM, EPROM type or, generally, a nonvolatile memory or any other component or set of electrical or electronic components capable of being made recognizable may be suitable for cable recognition. The connection of this or these components can be effected anywhere in the cable, possibly in package form and not necessarily at the ends of the latter or in its connection plugs.

The other wires of the cable 5 which are connected to the plug serve as electrical carrier for the information (nonlimiting example: RS232, RS422, Ethernet link, etc.) and possibly as power supply wires for the auxiliary device plugged into the cable (e.g.: analog/digital converter) or any other wire deemed necessary for the proper operation of the interface and of the apparatuses which are linked thereto.

By way of example, FIG. 2 shows that the component k5 has been inserted into the connection plug and includes three tags connected to three of the eight pins of the plug, the remaining five pins being available to provide the computer link with the apparatus to be linked.

Figure 3:
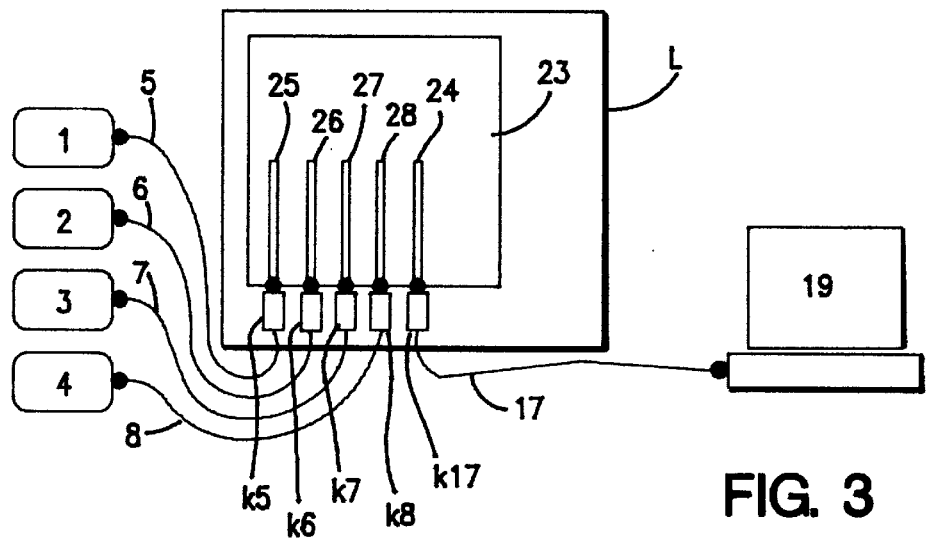
FIG. 3 represents a variant of the computerized linking device together with a motherboard of a computer fitted for example with expansion boards and able to fulfill the functionalities of the interface.

FIG. 3 represents the motherboard 23 of a computer fitted with expansion boards 25, 26, 27, 28 and 24 each fulfilling the role of an apparatus channel processor or of a computer channel processor. The computer which includes the motherboard 23 simultaneously fulfills the role of the computer 18 of FIG. 1, the functions of computer channel processor 14 of FIG. 1 and the functions of central processor 13 of FIG. 1. The expansion boards 25, 26, 27 and 28 fulfill the functions of the apparatus channel processors 9, 10, 11 and 12 of FIG. 1. The expansion board 24 fulfills the function of the computer channel processor 15 of FIG. 1. By making the aforesaid substitutions, operation identical to that described in FIG. 1 is obtained.

The overall inter-channel information transfer capacity, that is to say the speed of transfer of the information, is inversely proportional to the number of channel processors linked together and currently active in the interface but is proportional to the power of the channel processor circuits on the one hand and to the gross information throughput on the linkage linking the channels on the other hand. Stated otherwise, care must be taken to adapt the power of each channel processor as well as the speed of the internal linkage to the interface depending on the power of the apparatuses and computers to be linked and to the throughput of information to be exchanged.

The various devices described above are inter alia of very great utility and highly attractive in the field of the interconnecting of medical monitors or measurement apparatuses for scientific or industrial use of different makes or types to computers given the job of collection and analysis of the information gathered. The user's only task consists in connecting to the interface the specific cable of the apparatus or of the computer which he wishes to link. Configuration and adaptation of the hardware are then fully automatic. Furthermore, the fact that the flow of information is bidirectional enables these same computers to dispatch information to actuators of heterogeneous types (with communications protocols and physical linkages specific to each apparatus) in order to act upon a process. By reason of the harmonizing, by special conversion, of the protocols of the apparatuses connected to the interface, the computers plugged into the latter are enabled to talk to these apparatuses by means of one and the same communication protocol on a single physical linkage. The workload of these computers is thereby greatly reduced and, this being perhaps most significant, the application program running on these computers is no longer concerned with the types and makes of apparatuses to which it is connected. Stated otherwise, any change of apparatus linked to the interface does not necessitate either modification, adaptation, or even configuration of the application program. The interchangeability of the apparatuses is thereby guaranteed owing to the automatic adaptation of the interface to the new apparatus or computer connected.

I claim:

1. A computer-peripheral interfacing system accommodating heterogeneous protocol requirements to flexibly link computers and peripheral apparatuses to one another, the system comprising:

a peripheral apparatus link cable designed for connecting to a first peripheral apparatus, said peripheral apparatus link cable comprising a peripheral identification key for identifying the first peripheral apparatus and an end terminated with a standard peripheral connector;

a computer link cable designed for connecting to a first computer, said computer link cable comprising a computer identification key for identifying the first computer and an end terminated with a standard computer connector; and a connecting interface unit for linking the first peripheral apparatus to the first computer, said connecting interface unit comprising:

a peripheral cable plug designed to accept said standard peripheral connector of said peripheral apparatus link cable, a computer cable plug designed to accept said standard computer connector of said computer link cable, a first channel processor operatively connected with said peripheral cable plug, and designed to communicate with said peripheral apparatus link cable via said peripheral cable plug to ascertain said peripheral identification key for identifying the first peripheral apparatus, a second channel processor operatively connected with said computer cable plug, and designed to communicate with said computer link cable via said computer cable plug to ascertain said computer identification key for identifying the first computer, and a central processor operatively connected to said first and second channel processors and to a library of protocol conversion programs, and designed to configure said first channel processor based on a first protocol conversion program associated with said peripheral identification key and to configure said second channel processor based on a second protocol conversion program associated with said computer identification key, wherein said first and second channel processors are designed to be configured, on a software level, by said first and second conversions programs respectively so that said first and second channel processors communicate, via said peripheral apparatus link cable and said computer link cable respectively, with the first peripheral apparatus and the first computer respectively, and bidirectionally transfer information between the first peripheral apparatus and the first computer.

2. The system of claim 1, wherein said first and second conversion programs further comprise hardware-level protocol data relating to the first peripheral apparatus and the first computer respectively, and said first and second channel processors further comprise circuitry designed to be configured, on at least one of said software level and said hardware level, by said first and second conversion programs.

3. The system of claim 2, further comprising:

a plurality of said peripheral apparatus link cable, each of said plural peripheral apparatus link cables adapted for connecting one of plural peripheral apparatuses having heterogeneous peripheral protocol requirements; and a plurality of said computer link cable, each of said plural computer link cables adapted for connecting one of plural computers having heterogeneous computer protocol requirements, wherein said peripheral identification key associated with each of said plural peripheral apparatus link cables identifies the one of the plural peripheral apparatuses associated therewith, and said computer identification key associated with each of said plural computer link cables identifies the one of the plural computers associated therewith, so that upon any of the plural peripheral apparatuses and any of the plural computers being connected to said connecting interface unit with associated peripheral apparatus link and computer link cables, said central processor can configure said first and second channels to enable bilateral communications therebetween after ascertaining said associated peripheral and computer identification keys.

4. The system of claim 3, wherein said first and second channel processors further comprise circuitry designed to be configured, on both of said software level and said hardware level.

5. The system of claim 3, further comprising:

plural peripheral channels, each of said plural peripheral channels comprising one of said peripheral cable plug operatively connected to one of said first channel processor, each said first channel processor further comprising a first microprocessor and first and second communication lines; and plural computer channels, each of said plural computer channels comprising one of said computer cable plug and said second channel processor, each said second channel processor further comprising a second microprocessor and third and forth communication lines, wherein each of said plural peripheral channels and said plural computer channels are designed and adapted to communicate both with said central processor and another of said plural peripheral channels and said plural computer channels.

6. The system of claim 1, wherein said peripheral identification key and said computer identification key further comprise a read only memory storing data identifying the first peripheral apparatus and the first computer respectively.

7. The system of claim 1, wherein each of said peripheral identification key and said computer identification key further comprise one of a ROM, an EEPROM, an EPROM, a flash memory, and a random access memory backed up by battery, storing data identifying the first peripheral apparatus and the first computer respectively.

8. The system of claim 1, wherein said peripheral identification key is located adjacent said standard peripheral connector.

9. The system of claim 1, wherein said peripheral identification key is integral to said standard peripheral connector.

10. The system of claim 1, wherein said peripheral identification key is designed and adapted to be removable from said peripheral apparatus cable.

11. A computer link device for linking one or more apparatuses with heterogeneous communication protocols and one or more computers with heterogeneous communication protocols, comprising an interface, link cables, and identification keys associated with said link cables, said link cables designed and adapted for connection between said interface and the apparatuses and the computers that are to be linked, said interface comprising plural plugs for connection to said link cables, plural channel processors capable of being configured at the software level following the reading of said identification keys associated with said link cables, a library of protocol conversions programs, and a central processor operatively connected to said plural channel processors and to said library, wherein said central processor is designed and adapted to select from said library, based on said identification keys, software protocol information to configure said plural channel processors to enable bidirectional transfer of information between the apparatuses and the computers connected to said interface.

12. The device of claim 11, wherein each of said plural channel processors further comprise plural switchable circuits, each of said circuits adapted to a particular hardware-level protocol so that said plural channel processors are hardware-level protocol configurable, wherein said interface is designed and adapted to determine hardware-level protocol configuration requirements of the apparatuses and computers that are to be linked, and to configure said plural channel processors accordingly, based on said identification key associated with said link cable connected to said each of said plural channels.

13. The device of claim 12, wherein each of said link cables further comprise one of said identification keys.

14. The device of claim 11, wherein each of said channel processors comprise a microprocessor and two communications lines adapted to, respectively: 1) communicate with the apparatuses or computers linked to said interface via said link cables so that the apparatuses and computers bidirectionally transfer information therebetween, and 2) to read said identification keys.

15. The device of claim 13, wherein each of said identification keys comprise an electrical or electronic component.

16. The device of claim 15, wherein said electrical or electronic component further comprises at least one of a ROM, an EEPROM, an EPROM, a flash memory, and a random access memory backed up by a battery.

17. The device of claim 16, wherein said identification keys are connected to said link cables along a length of said link cables.

18. The device of claim 13, wherein said identification keys connect to one end of said link cables.

19. The device of claim 13, wherein said identification keys are integral to a connection plug of said link cables designed and adapted for connection to said plural plugs.

* * * * *